(12) United States Patent
Galbreath et al.

(10) Patent No.: US 10,786,818 B2
(45) Date of Patent: Sep. 29, 2020

(54) AIRCRAFT PROACTIVE AIR AND SURFACE PURIFICATION COMPONENT

(71) Applicants: Jimmy Devoy Galbreath, Richmond Hill, GA (US); Mallie Jamieson Seckinger, Sr., Savannah, GA (US)

(72) Inventors: Jimmy Devoy Galbreath, Richmond Hill, GA (US); Mallie Jamieson Seckinger, Sr., Savannah, GA (US)

(73) Assignee: Aviation Clean Air, LLC, Pooler, GA (US)

( * ) Notice: Subject to any disclaimer, the term of this patent is extended or adjusted under 35 U.S.C. 154(b) by 281 days.

(21) Appl. No.: 15/892,959

(22) Filed: Feb. 9, 2018

(65) Prior Publication Data

US 2019/0247862 A1    Aug. 15, 2019

(51) Int. Cl.
| | |
|---|---|
| B03C 3/41 | (2006.01) |
| B03C 3/82 | (2006.01) |
| B64D 13/06 | (2006.01) |
| B03C 3/38 | (2006.01) |
| H01T 23/00 | (2006.01) |

(52) U.S. Cl.
CPC .............. *B03C 3/41* (2013.01); *B03C 3/82* (2013.01); *B64D 13/06* (2013.01); *B03C 3/38* (2013.01); *B03C 2201/04* (2013.01); *B03C 2201/10* (2013.01); *B64D 2013/067* (2013.01); *H01T 23/00* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 3,734,342 | A * | 5/1973 | Patterson | ............... | H02G 3/081 |
| | | | | | 220/3.94 |
| 5,848,718 | A * | 12/1998 | Colwell | ................ | H02G 3/081 |
| | | | | | 220/4.02 |
| 7,607,553 | B2 * | 10/2009 | Weber | .................... | H02G 3/086 |
| | | | | | 174/562 |
| 9,660,425 | B1 * | 5/2017 | Sunshine | ............... | H01T 23/00 |
| 9,754,757 | B2 * | 9/2017 | Nishida | .................... | H01T 19/04 |
| 9,847,623 | B2 * | 12/2017 | Sunshine | ............... | H01T 19/04 |
| 2014/0077701 | A1 * | 3/2014 | Nishida | .................... | H01T 19/04 |
| | | | | | 315/111.81 |
| 2014/0209799 | A1 * | 7/2014 | Waddell | ................ | G01N 27/62 |
| | | | | | 250/336.1 |
| 2016/0204581 | A1 * | 7/2016 | Nishida | .................... | B03C 3/38 |
| | | | | | 250/423 F |
| 2016/0218490 | A1 * | 7/2016 | Nishida | .................... | A61L 9/22 |

* cited by examiner

*Primary Examiner* — Christopher P Jones
*Assistant Examiner* — Sonji Turner
(74) *Attorney, Agent, or Firm* — Clements Bernard Walker; Seth L. Hudson

(57) ABSTRACT

The present invention provides methods and systems for an ionization device that includes a base portion, a first pair and a second pair of opposed sidewalls extending upwardly from the base portion to form an upper edge, a top portion is engaged to the upper edge, and a cavity is formed within the base portion, the two pairs of opposed sidewalls, and the top portion. A probe assembly is disposed on the top portion, wherein the probe assembly comprises a probe seat selectively secured to an exterior portion of the top portion and a wire extends through the probe seat for supplying electrical current to an emission portion that emits ions.

19 Claims, 14 Drawing Sheets

AIRCRAFT PROACTIVE AIR AND SURFACE PURIFICATION COMPONENT

FIELD OF THE INVENTION

The present invention relates generally to an ionization device and more generally relates to an aircraft proactive air and surface purification component.

BACKGROUND OF THE INVENTION

Air and other fluids are commonly treated and delivered for a variety of applications. For example, in heating, ventilation and air-conditioning (HVAC) applications, air may be heated, cooled, humidified, dehumidified, filtered or otherwise treated for delivery into residential, commercial or other spaces.

Needs exist for improved systems and methods of treating and delivering air for aircraft. It is to the provision of improved systems and methods meeting these needs that the present invention is primarily directed.

BRIEF SUMMARY OF THE INVENTION

According to an embodiment of the present invention, an ionization device that includes a base portion, a first pair and a second pair of opposed sidewalls extending upwardly from the base portion to form an upper edge, a top portion is engaged to the upper edge, and a cavity is formed within the base portion, the two pairs of opposed sidewalls, and the top portion. A probe assembly is disposed on the top portion, wherein the probe assembly comprises a probe seat selectively secured to an exterior portion of the top portion and a wire extends through the probe seat for supplying electrical current to an emission portion that emits ions.

According to another embodiment of the present invention, the ionization device includes a probe sleeve that extends upwardly from the probe seat and an emission portion extends from an end of the probe sleeve.

According to yet another embodiment of the present invention, the ionization device includes an ion generator disposed within the cavity.

According to yet another embodiment of the present invention, the ionization device includes a probe seat selectively secured to the top portion by a fastening device.

According to yet another embodiment of the present invention, the ionization device includes a top portion that extends over the upper edge of the first pair of sidewalls and forming a lip having at least one bore.

According to yet another embodiment of the present invention, the ionization device includes a probe assembly that comprises a probe sleeve extending generally upward from the probe seat first end and a second end, the diameter of the first end is larger than the diameter of the second end.

According to yet another embodiment of the present invention, the ionization device includes a probe seat that is generally square and has four corners, wherein a bore is positioned adjacent each corner for receiving a correspondingly fastening device.

According to yet another embodiment of the present invention, the ionization device includes a probe seat that contains two centrally located bores for receiving a correspondingly fastening device.

According to yet another embodiment of the present invention, the ionization device includes a base portion, a first pair and a second pair of opposed sidewalls extending upwardly from the base portion to form an upper edge, a top portion is engaged to the upper edge, and a cavity is formed within the base portion, the two pairs of opposed sidewalls, and the top portion. A probe assembly is disposed on the top portion, wherein the probe assembly comprises a probe seat selectively secured to an exterior portion of the top portion and probe sleeve extends upwardly from the probe seat. A wire extends through the probe seat and probe sleeve for supplying electrical current to an emission portion that emits ions disposed on an end of the probe sleeve.

According to yet another embodiment of the present invention, the ionization device includes a military grade electrical connector disposed within a sidewall for receiving a power supply and providing power to the device.

According to yet another embodiment of the present invention, the ionization device includes a circuit board positioned within the cavity.

According to yet another embodiment of the present invention, the ionization device includes an ion generator positioned within the cavity and a circuit board positioned within the cavity for controlling the ion generator.

According to yet another embodiment of the present invention, the ionization device includes a light emitting diode.

According to yet another embodiment of the present invention, the ionization device includes an emission portion that includes an electrode for emitting ions.

According to yet another embodiment of the present invention, the ionization device includes a brush with a plurality of conductive bristles for emitting ions.

According to yet another embodiment of the present invention, the ionization device includes a base portion, a first pair and a second pair of opposed sidewalls extending upwardly from the base portion to form an upper edge, a top portion is engaged to the upper edge, and a cavity is formed within the base portion, the two pairs of opposed sidewalls, and the top portion. An ion generator is disposed within the cavity, and a probe assembly is disposed on the top portion. The probe assembly comprises a probe seat selectively secured to an exterior portion of the top portion and a wire extends through the probe seat for supplying electrical currently to an emission portion that emits ions.

According to yet another embodiment of the present invention, the ionization device that operates at 28 volts.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
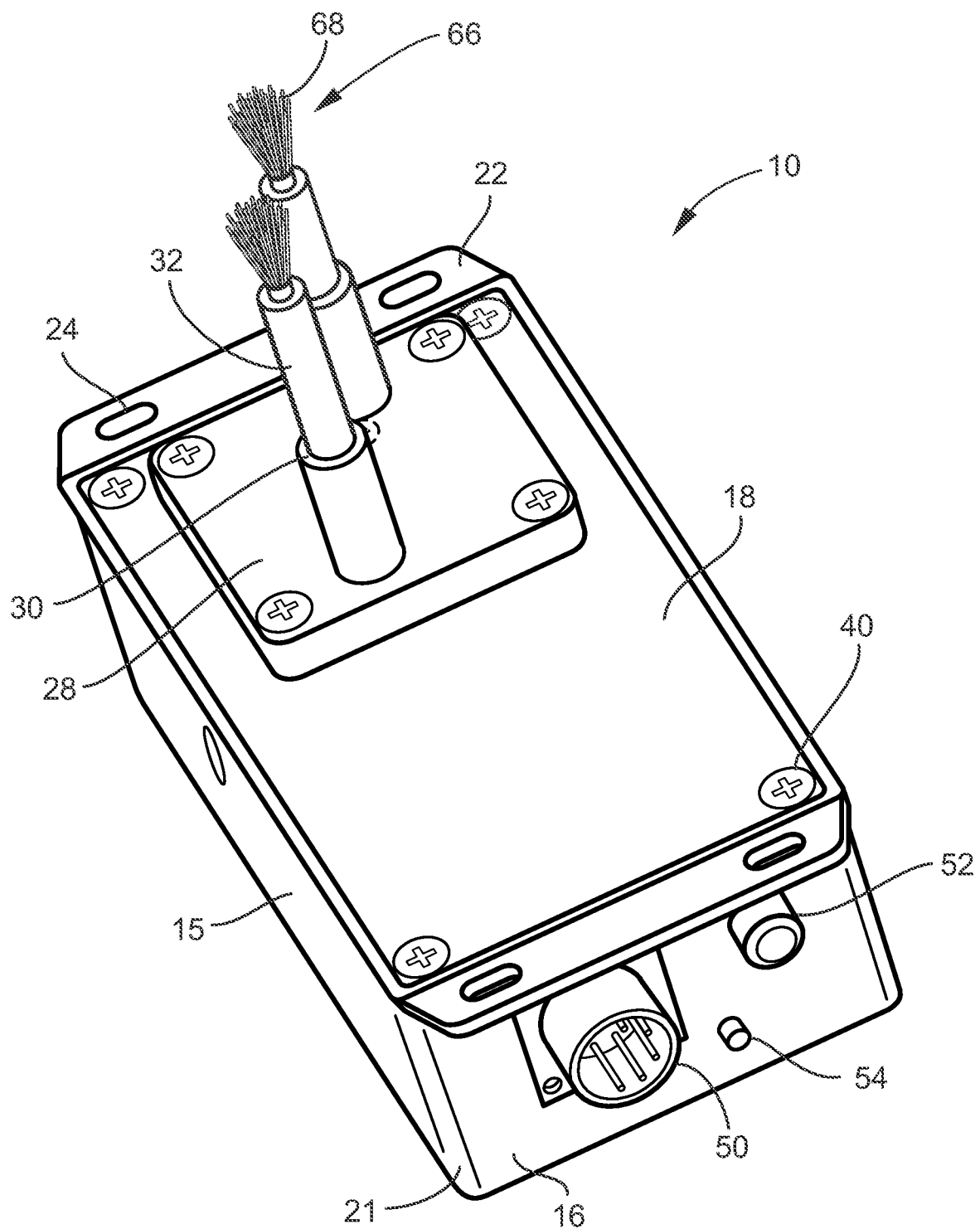
FIG. 1 is perspective view of one embodiment of the ionization device.
Figure 2:
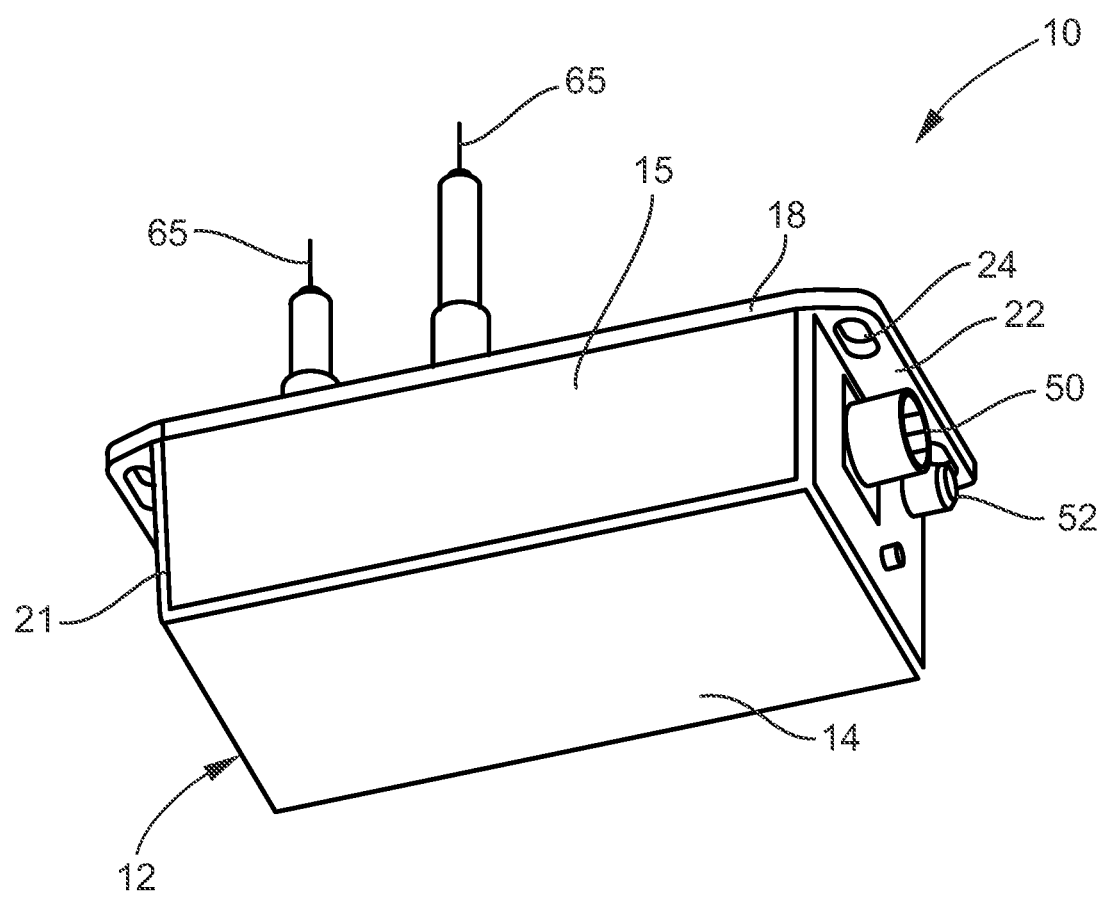
FIG. 2 is another embodiment of the ionization device.
Figure 10:
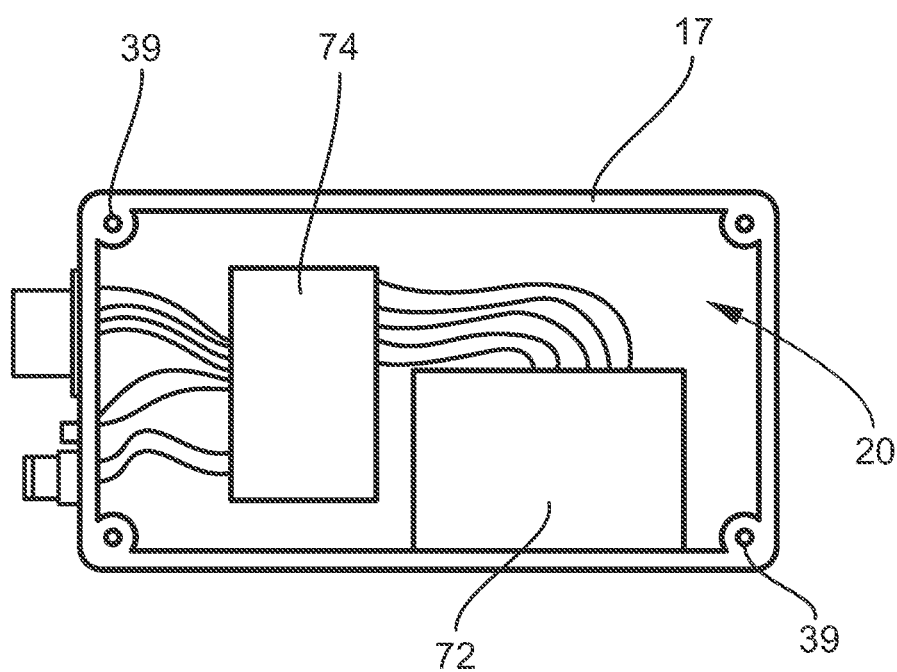
FIG. 10 is a view of the cavity of the present invention.
Figure 11:
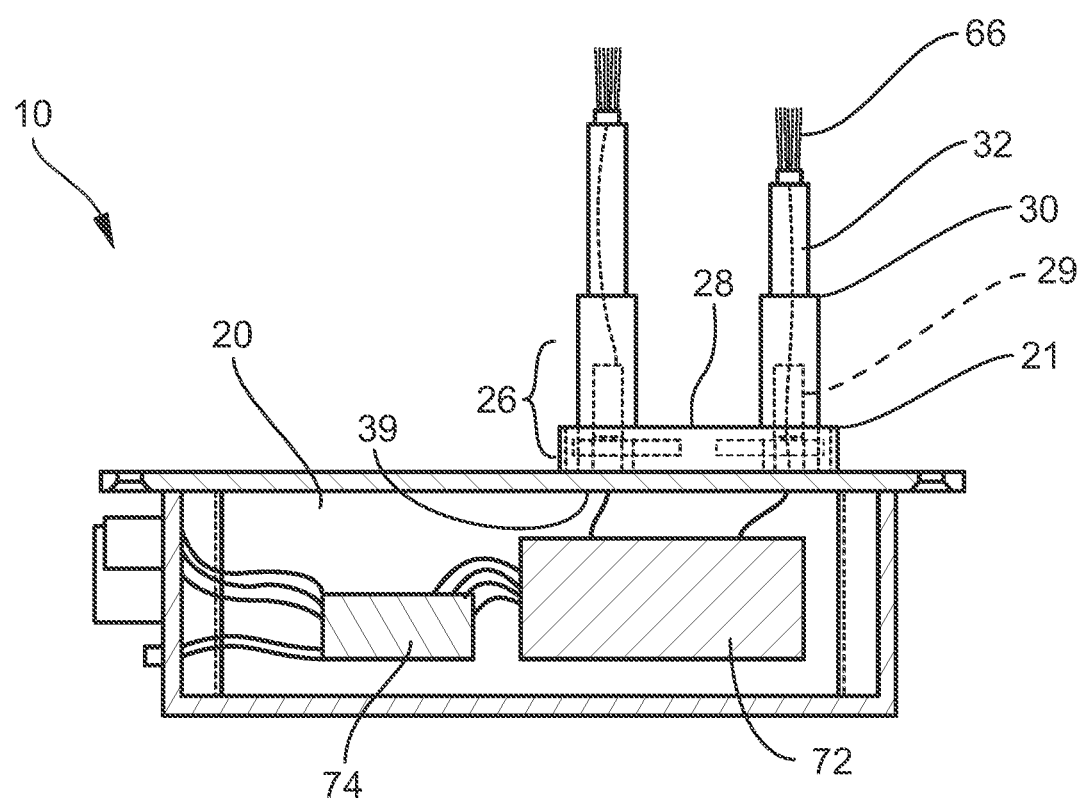
FIG. 11 is a side cut-away view of the present invention.
Figure 12:
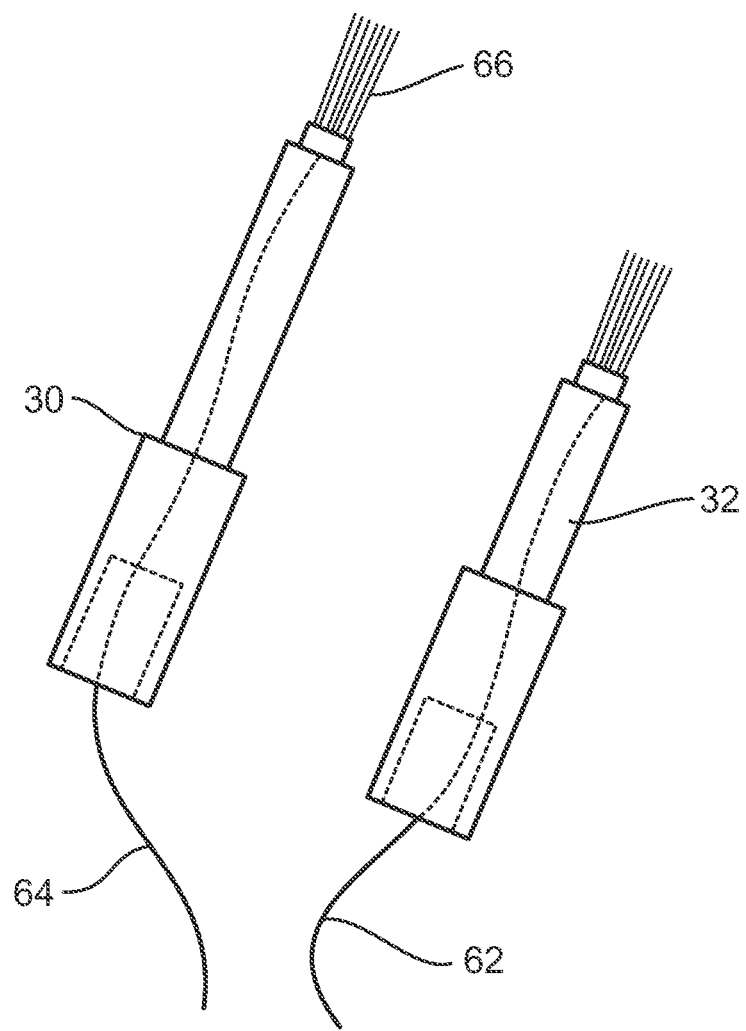
FIG. 12 is a perspective view of the probes of the present invention.

Referring now specifically to the drawings, an aircraft proactive air and surface purification component, hereinafter referred to an ionization device, is illustrated in FIGS. 1 and 2 and are shown generally at reference numeral 10. The device 10 contains a base portion 12. The base portion 12 includes a base 14 that extends to an outer edge with a first pair of opposed sidewalls 15 and a second pair of opposed sidewalls 16 extending upwardly therefrom to an upper edge 17. A top portion 18 is engaged to the upper edge 17 on the two pairs of opposed sidewalls 15, 16 of the base portion 12. A cavity 20, as shown in FIGS. 10 and 11, is formed within the base portion 12 and within the base 14, two pairs of opposed sidewalls 15,16, and top portion 18. The first pair of sidewalls 15 interconnects the second pair of sidewalls 16 to define corners 21.

The device 10 includes a front side portion, a back side portion, a left side portion, and a right side portion. The top portion 18 extends from the front side portion to the back side portion and has an exterior portion and interior portion. While the top portion 18 and sidewalls 15, 16 on the left side portion and right side portion are relatively flush, the top portion 18 on the front side portion and back side portion extend away from the sidewalls 15, 16, forming a lip 22 on the front side portion and back side portion of the device 10. The lip 22 contains at least one bore 24, and as illustrated two bores 24, on either side of the lip and extending from the top surface of the top portion 18 to the bottom surface of the top portion 18.

Figure 3:
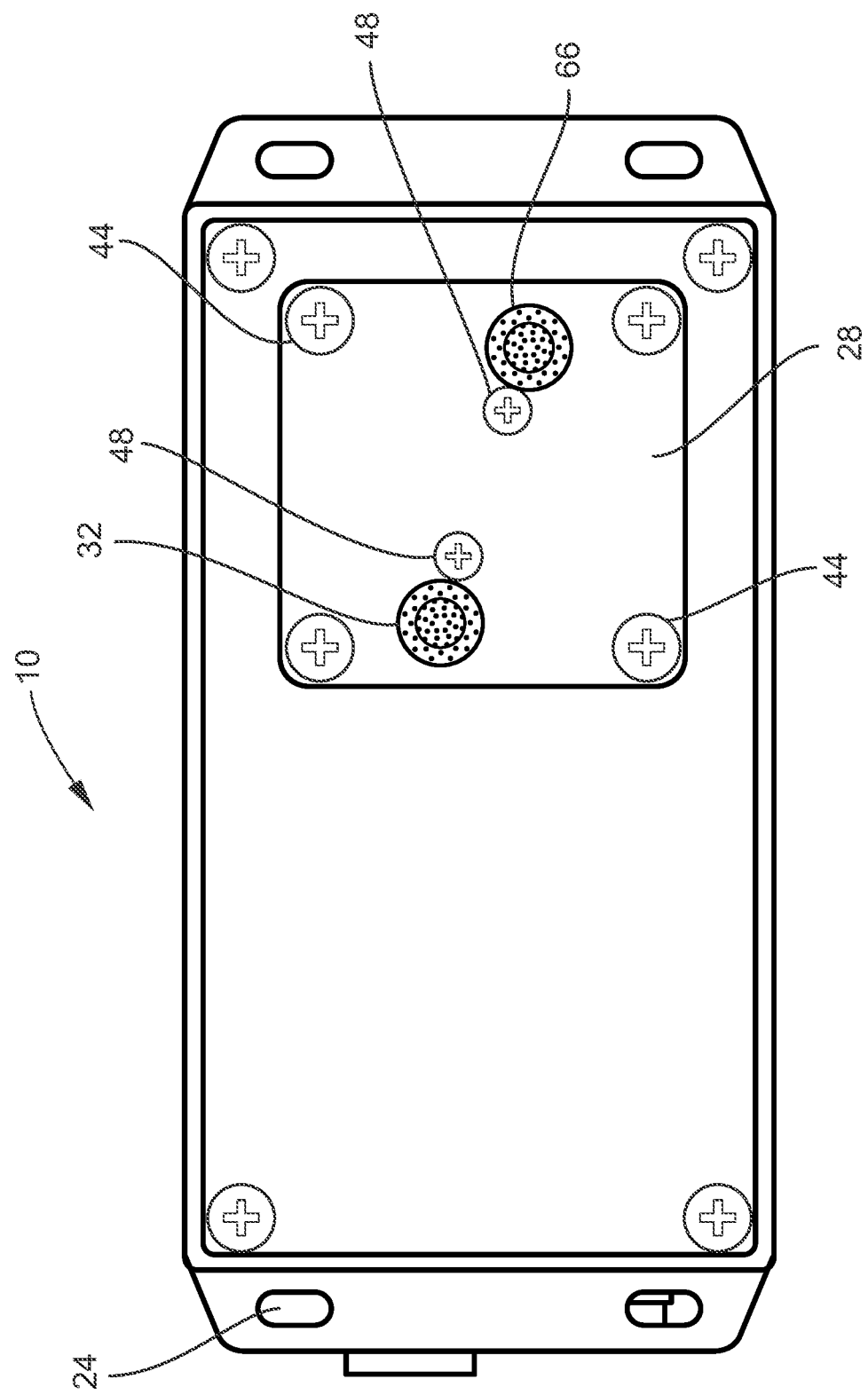
FIG. 3 is a top view of the present invention.
Figure 9:
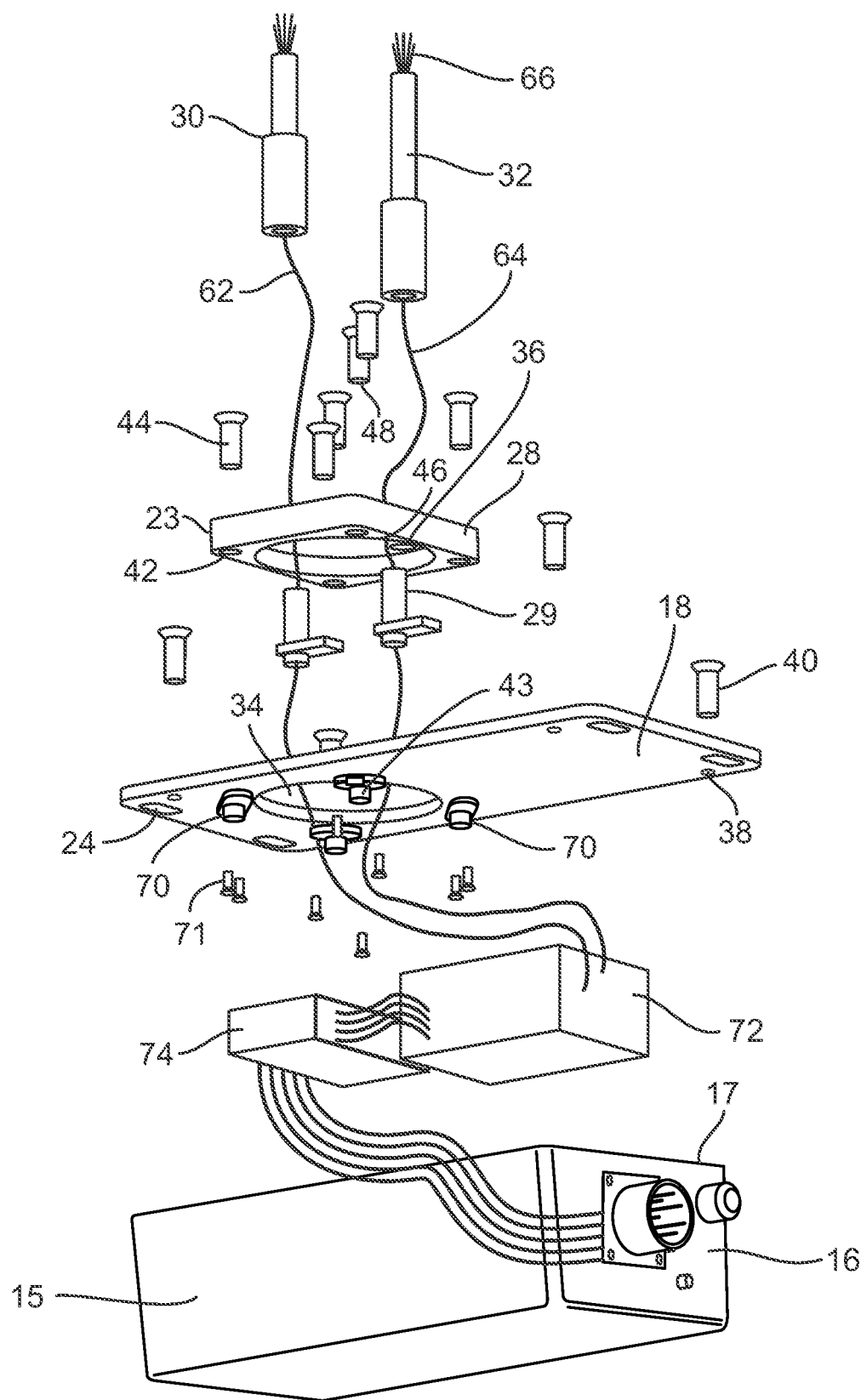
FIG. 9 is an exploded view of the present invention.

A probe assembly 26, as shown in FIG. 11 is engaged to the top portion 18. The probe assembly 26 consists of a probe seat 28 with at least one probe sleeve 32 extending upwardly from the probe seat 28 and a probe retention device 29. As illustrated in FIGS. 5, 6, 7, 8, 11, and 14, two probe sleeves 32 extend upwardly from the probe seat 28. As shown in FIG. 11, the probe sleeve 32 has a first end and a second end, wherein the first end of the probe sleeve 32 is engaged to the probe seat 28 and the second end extends upwardly. The first end of the probe sleeve 32 has a greater diameter than the second end. At a height on the probe sleeve 32, the diameter changes, thus forming a circular shelf 30 on the probe sleeve 32. The probe sleeve 32 has a generally hollow interior with an opening in the first end. As shown in FIG. 9, a hole 34 extends from the cavity 20 to the top surface of the top portion 18. A corresponding hole 36, also shown in FIG. 9, extends through the probe seat 28 through which the probe retention device 29 is inserted and received. The probe retention device 29 is generally L-shaped having a vertically extending hollow tube with a first end and a second end. A plate extends horizontally from the hollow tube in close proximity to the second end. The first end extends through the hole 36 and is received within the opening of the first end of the probe sleeve 32 as illustrated in FIG. 11. The end of the plate opposite the hollow tube contains a bore for receiving a fastening device 48, as shown in FIG. 3.

A high voltage wire extends from the cavity 20 and through the hole 34 in the top portion 18 and through a hole 36 in the probe seat 28. The high voltage wire extends through the hollow interior of the probe sleeve 32, exiting through the second end of the probe sleeve 32. As illustrated, a first high voltage wire 62 extends through the hollow interior of the probe sleeve 32, exiting through the second end of the probe sleeve 32 of a first probe assembly 26, as shown in FIG. 11. A second high voltage wire 64 extends through the hollow interior of the probe sleeve 32, exiting through the second end of the probe sleeve 32 of a first probe assembly 26. The end of the first high voltage wire 62 and second high voltage wire 64 contains an emission portion that is able to emit electrons. The emission portion may be an electrode 65 that allows ions to be emitted, as shown in FIG. 2. Alternatively, the emission portion may be a brush 66, as shown in FIGS. 2-14, that is able to emit ions and described more fully below.

In one embodiment and as shown in FIG. 1, the end of the first and second high voltage wire (62, 64) contains an emission portion that is a brush 66 containing a plurality of bristles 68 that extend outwardly away from the brush 66. The brush 66 and its bristles 68 may be made of any material that conducts electricity. In one embodiment, the bristles 68 of the brush 66 carbon fiber brushes to conduct electricity. For example, the bristles 68 of the brush 66 may be composed of polypropylene or polyethylene and impregnated with carbon. Generally, the bristles 68 of the brush 66 may contain between about 20 to about 80 wt % polypropylene copolymer or polyethylene copolymer, between about 5 to about 40 wt % talc, and from about 5 to 40 wt % carbon black. However, any other resistive, inductive, reactive or conductive plastic or non-metallic material may be utilized for the bristles 68 of the brush 66.

Figure 14:
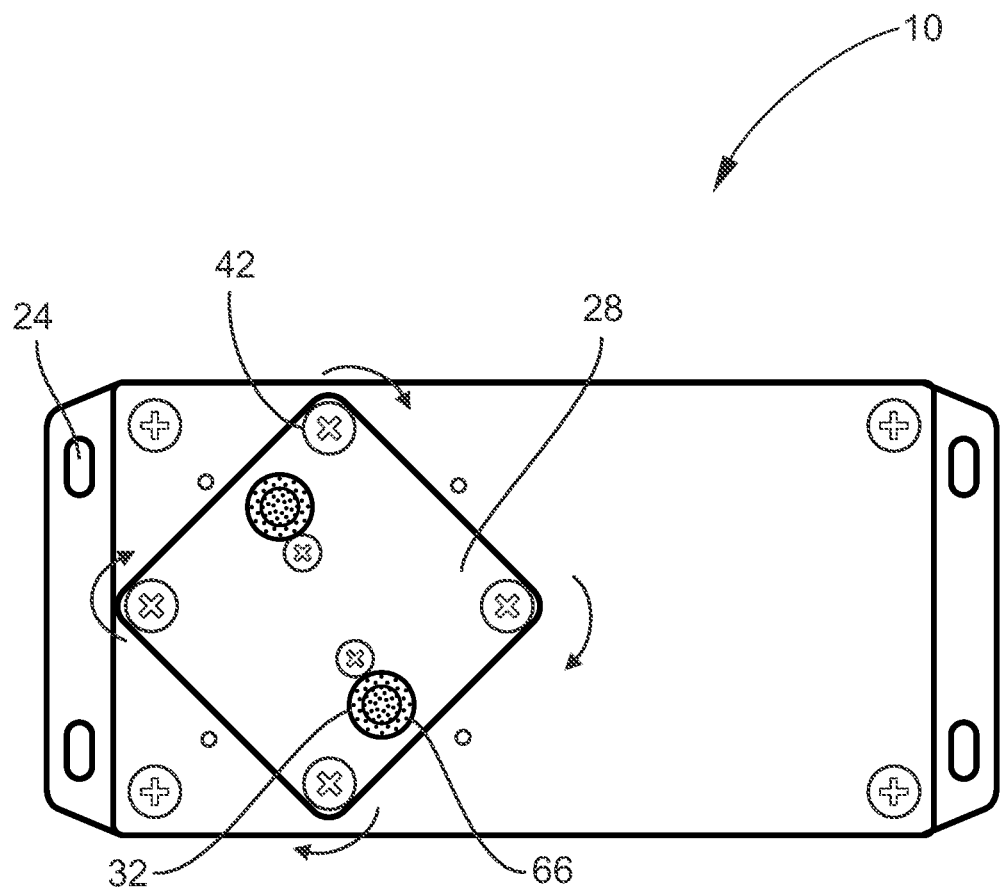
FIG. 14 is a perspective view showing the rotation of the probe seat.

The probe seat 28 has a bottom portion and a top portion. The bottom portion of the probe seat 28 is engaged to the exterior portion of the top portion 18. The probe seat 28 is engaged to the top portion 18 by a fastening device 44. As illustrated in FIGS. 9 and 14, the fastening device is a screw. The probe seat 28 is generally square and has threaded bores 42 adjacent the outer edges near the corners 23 that sit overtop correspondingly threaded bores 39. The bores 42 are designed to receive a correspondingly fastening device 44 for selectively securing the probe seat 28 to the top portion 18. The probe seat 28 is selectively secured to the top portion 18 with a nut plate 70 and rivit 71. As illustrated in FIG. 9, the device 10 includes four nut plates 70 positioned on the interior portion of the top portion 18 and each utilizing a rivet 71 for selectively securing the top portion 18 to the probe seat 28.

The probe seat 28 is able to be rotated with respect to the top portion 18, as illustrated in FIG. 14. In other words, the probe seat 28 is able to be turned clock-wise or counter-clockwise 90° with respect to the top portion 18 with the top portion 18 staying stationary. The purpose of rotating the top portion 18 is to change the position of the brushes 66 extending from the second end of the probe sleeve 32, depending upon the arrangement of the device 10 in a conduit for maximizing the ion output into the air stream, while preventing the ions from recombining within the air stream. The fastening devices 44 may be removed, allowing the probe seat 28 to be rotated with respect to the stationary position of the top portion 18. As illustrated, the fastening devices 44 are a nut plate and washer combination. Alternatively, the fastening device 44 may be a screw or the like. The fastening devices 44 are reinserted into the bores 42 of the probe seat 28 for again selectively securing the probe seat 28 to the top portion 18.

The probe seat 28 contains centrally located bores 46 adjacent the probe sleeve 32. These bores 46 are positioned adjacent the probe sleeve 32 and above the bore of the plate of the probe retention device 29. The bore 46 is designed to receive a fastening device 48. As illustrated in FIG. 9, the fastening device 48 is a nut and washer assembly. The fastening device 48 retains the probe assembly 26 within the probe seat 28. The fastening device 48 may be removed for allowing the removal of the probe assembly 26 from the probe seat 28, facilitating replacement.

Figure 4:
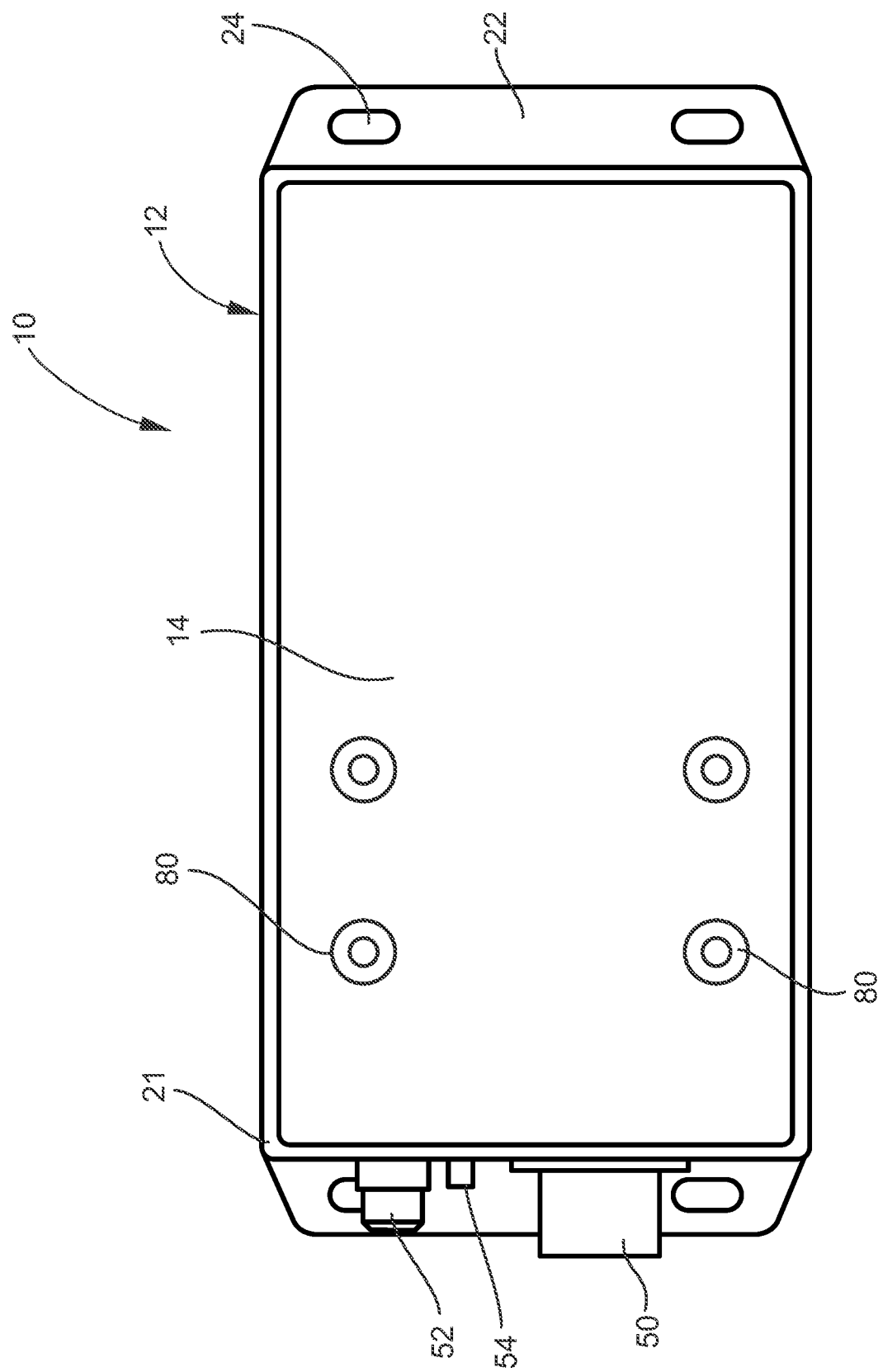
FIG. 4 is a bottom view of the present invention.
Figure 5:
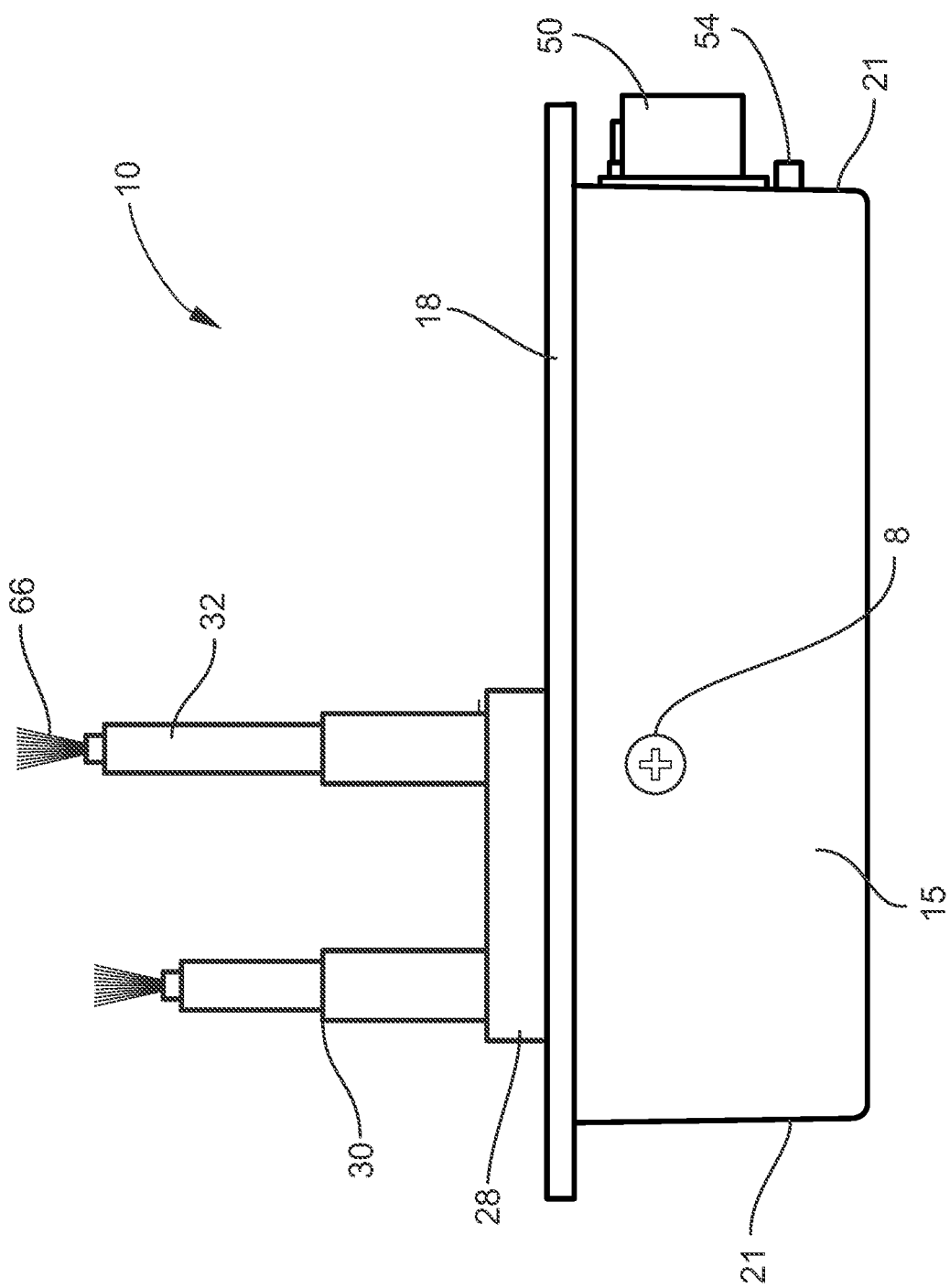
FIG. 5 is a left side view of the present invention.
Figure 6:
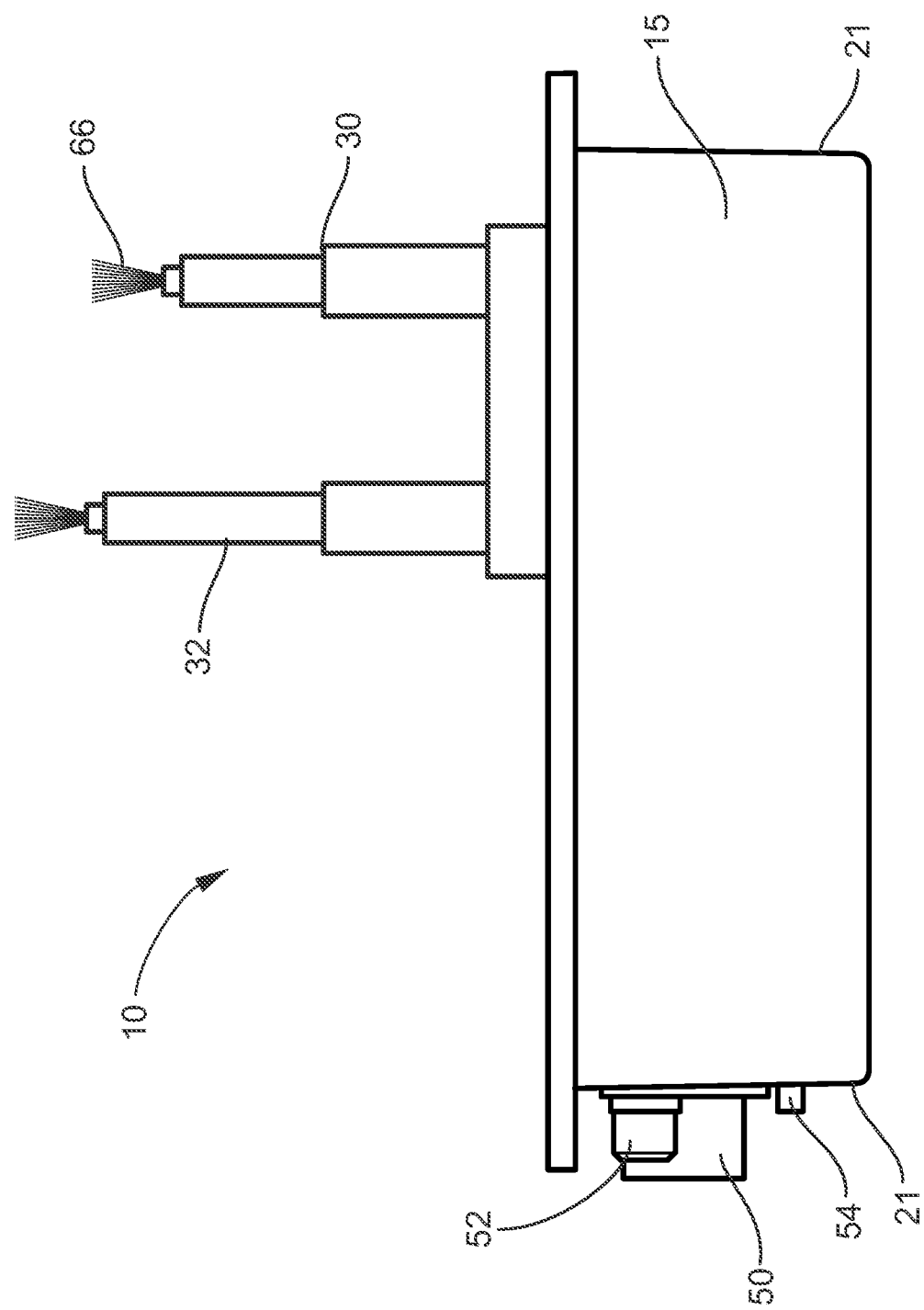
FIG. 6 is a right side view of the present invention.
Figure 7:
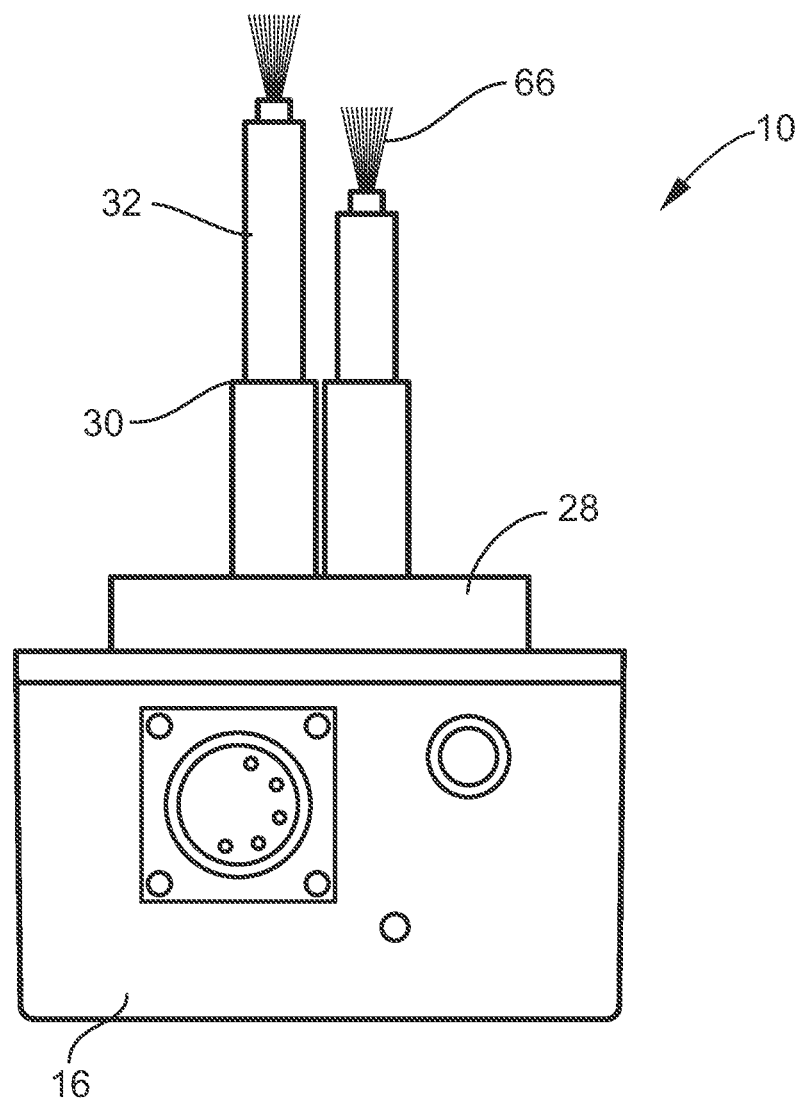
FIG. 7 is a front side view of the present invention.
Figure 8:
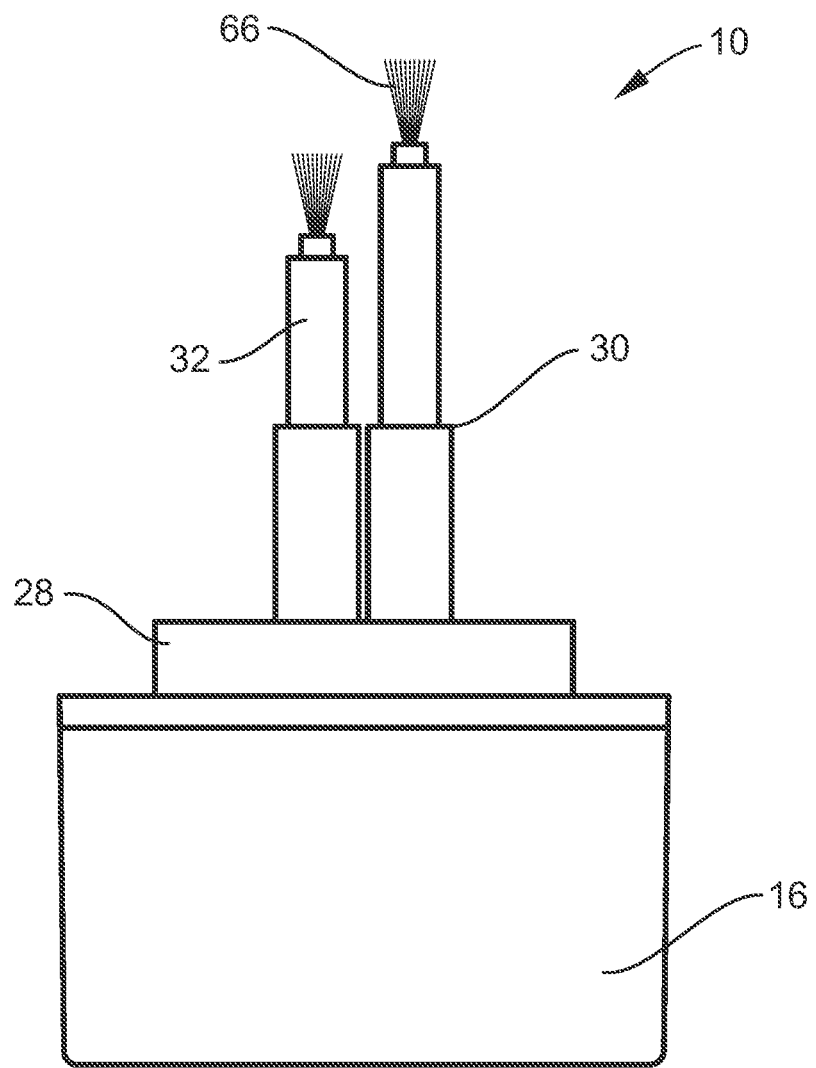
FIG. 8 is a back side view of the present invention.

The cavity 20 of the ionization device 10 contains an ion generator 72 and circuit board 74. A suitable ion generator 72 may be obtained by Global Plasma Solutions, Inc. of Savannah Ga. The circuit board 74 controls the ion generator 72. The top portion is selectively secured to the upper edge 17 of the two pairs of opposed sidewalls 15, 16. The top portion 18 is generally rectangular or square. In one embodiment, the top portion 18 contains a threaded bore 38 and as illustrated four threaded bores 38 adjacent the corners of the top portion 18. Within the corners that join the two opposed sidewalls 15, 16 an adjacent threaded bore 39 is positioned directly under the threaded bore 38 of the top portion 18. A correspondingly threaded fastening device 40 is received within the threaded bores 18 and 39, selectively securing the top portion 18 to the upper portion of the two pairs of opposed sidewalls 15, 16. To access the cavity 20, the top portion 18 may be removed to allow such access. The circuit board 74 is retained within the cavity 20 and retained on the base 14 by a fastening device 80. As illustrated in FIG. 4, four bores are positioned in the base 14 that extends from the exterior side to the interior side of the base 14 and receives the fastening device 80. The circuit board 74 contains a receptacle for receiving the fastening device 80 and selectively securing the circuit board 74 within the cavity 20 and specifically on the base 14. As illustrated in FIG. 5, one sidewall of the first pairs of sidewalls 15 contains a bore positioned within the sidewall 15 for receiving a fastening device 82. The ion generator 72 contains a receptacle for receiving the fastening device 82 for selectively securing the ion generator 72 within the cavity 20 and specifically to the sidewall 15.

A power connector 50 is positioned on the device 10, and as illustrated within the front side portion of the ionization device 10. The power connector 50 receives the electricity to power the device 10 and the device 10 operates at 28 volts direct current (VDC). Preferably, the power connector 50 is a military grade power connector 50 and is engaged to a power supply from the aircraft. A light emitting diode (LED) 54 is positioned on the device 10, and as illustrated within the front side portion. The LED 54 is electrically coupled to the circuit board 74 for indicating power is received to the device 10. A fuse and fuse holder 52 are also positioned on or within the device 10. As illustrated, the fuse and fuse holder 52 are within the front side portion. As illustrated in FIGS. 9 and 10, a plurality of wires are engaged to the power connector 50 that extend to the circuit board 74 for supplying power to the circuit board 74. A plurality of wires extend from the circuit board 74 to the ion generator 72. The first high voltage wire 62 and second high voltage 64 wire extend from the ion generator 72.

Figure 13:
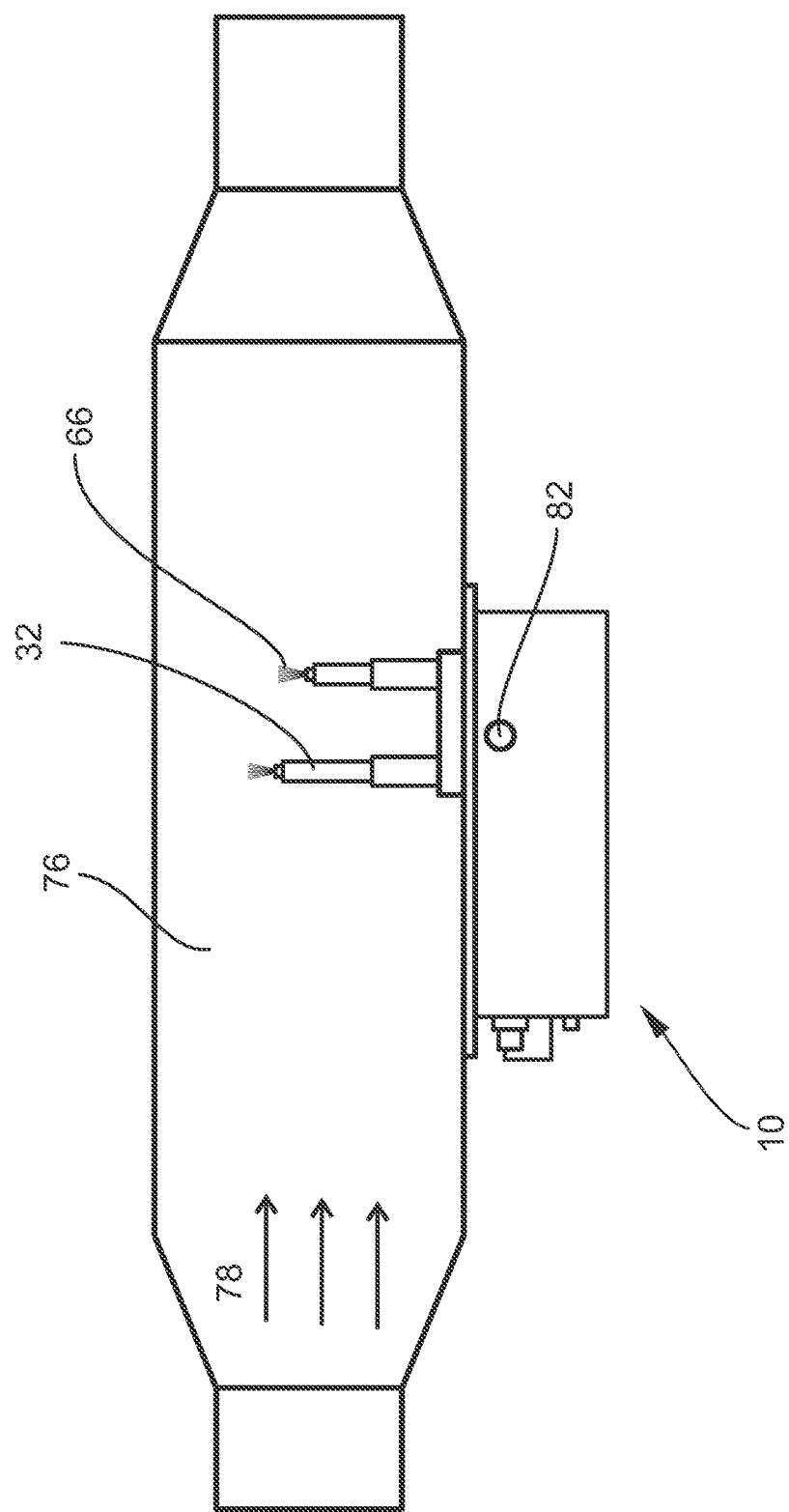
FIG. 13 is a side view of the ionization device engaged to a conduit.

The ionization device 10 is positioned and secured in place within a conduit 76, such as a conditioned air duct. Preferably, the ionization device 10 is strapped (with clamps) to the existing environmental control system (ECS), air ducts, and tubes of an airplane, helicopter, or the like. As illustrated in FIG. 13, the probe assembly 26 is positioned within the conduit 76. Preferably, the brushes 66 are aligned generally perpendicularly to the direction of the airflow 78 across the probe assembly 26 and brushes 66. Ions are emitted from the tips of the brushes and into the airflow 78. The ions emitted can be negative from one brush 66 or electrode 65 and positive from another brush 66 or electrode 65. Alternatively, the ions may be all positive or all negative. As illustrated in FIG. 13, one probe sleeve 32 may have a different length than the other probe sleeve 32. The differing lengths of the probe sleeves 32 results in the brushes 66 or electrodes 65 set at different heights within the conduit 76, thus allowing ions to be emitted at different levels within the airflow 78. To achieve the maximum and most advantageous ion emission, the probe seat 28 may be rotated as desired by the user.

The treatment of air by delivery of ionization to an airflow within a conduit 76 according to the systems and methods of the present invention may be utilized for various purposes. For example, application of ionization to an airflow within an conduit such as a duct may be utilized to abate allergens, pathogens, odors, gases, volatile organic compounds, bacteria, virus, mold, dander, fungus, dust mites, animal and smoke odors, and/or static electricity in a treated air space to which the airflow is directed. Ionization of air in living and working spaces may reduce aircraft acquired illness and improve interior air quality; and additionally, can reduce the quantity of outside air needed to be mixed with the treated indoor air, reducing operational costs by enabling a greater degree of air recirculation.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An ionization device comprising:
   a base portion;
   a first pair and a second pair of opposed sidewalls extending upwardly from the base portion to form an upper edge;
   a top portion is engaged to the upper edge, the top portion has an exterior portion and an interior portion;
   a cavity is formed within the base portion, the two pairs of opposed sidewalls, and the top portion; and a probe assembly disposed on the top portion, wherein the probe assembly comprises a probe seat with a top portion and a bottom portion that is selectively secured to an exterior portion of the top portion and extending to a height above the exterior portion of the top portion, a bore is disposed within the probe seat and extending from the top portion to the bottom portion of the probe seat that is overtop a corresponding bore on the exterior portion of the top portion for receiving a fastening device, and a wire extends through the probe seat for supplying electrical currently to an emission portion that emits ions.

2. The ionization device according to claim 1, wherein a probe sleeve extends upwardly from the probe seat and the emission portion extends from an end of the probe sleeve.

3. The ionization device according to claim 1, further comprising an ion generator disposed within the cavity.

4. The ionization device according to claim 1, wherein the probe seat is selectively secured to the top portion by a fastening device.

5. The ionization device according to claim 1, wherein the top portion extends over the upper edge of the first pair of sidewalls and forming a lip having at least one bore.

6. The ionization device according to claim 1, wherein the top portion is selectively secured to the first and second pair of opposed sidewalls allowing access to the cavity.

7. The ionization device according to claim 1, wherein the probe seat is generally square and having four corners, wherein a bore is positioned adjacent each corner for receiving a correspondingly threaded fastening device.

8. The ionization device according to claim 1, wherein the probe seat contains two centrally located bores for receiving a corresponding fastening device.

9. An ionization device for use in a conduit of an aircraft, comprising:
a base portion;
a first pair and a second pair of opposed sidewalls extending upwardly from the base portion to form an upper edge;
a top portion is engaged to the upper edge;
a cavity is formed within the base portion, the two pairs of opposed sidewalls, and the top portion; and
a probe assembly disposed on the top portion, wherein the probe assembly comprises a probe seat selectively secured to an exterior portion of the top portion and a probe sleeve extends upwardly from the probe seat, a wire extends through the probe seat and the probe sleeve for supplying electrical current to an emission portion that emits ions disposed on an end of the probe sleeve, the probe seat is generally square and having four corners, wherein a bore is positioned adjacent each corner for receiving a correspondingly threaded fastening device.

10. The ionization device according to claim 9, further comprising a military grade electrical connector disposed within a sidewall for receiving a power supply and providing power to the device.

11. The ionization device according to claim 9, further comprising a circuit board positioned within the cavity.

12. The ionization device according to claim 9, further comprising an ion generator positioned within the cavity and a circuit board positioned within the cavity for controlling the ion generator.

13. The ionization device according to claim 9, further comprising a light emitting diode.

14. The ionization device according to claim 9, wherein the emission portion comprises an electrode for emitting ions.

15. The ionization device according to claim 9, wherein the emission portion comprises a brush with a plurality of conductive bristles for emitting ions.

16. An ionization device for use on aircraft comprising:
a base portion;
a first pair and a second pair of opposed sidewalls extending upwardly from the base portion to form an upper edge;
a top portion is engaged to the upper edge;
a cavity is formed within the base portion, the two pairs of opposed sidewalls, and the top portion;
an ion generator disposed within the cavity; and
a probe assembly disposed on the top portion, wherein the probe assembly comprises a probe seat selectively secured to an exterior portion of the top portion and a wire extends through the probe seat for supplying electrical currently to an emission portion that emits ions, the probe seat contains two centrally located bores for receiving a corresponding fastening device.

17. The ionization device according to claim 16, wherein a probe sleeve extends upwardly from the probe seat and the emission portion extends from an end of the probe sleeve.

18. The ionization device according to claim 16, wherein the device operates at 28 VDC.

19. The ionization device according to claim 16, wherein the top portion extends over the upper edge of the first pair of sidewalls and forming a lip having at least one bore.

* * * * *